March 21, 1967 K. H. LINKE 3,310,359
WING MIRROR ASSEMBLY
Filed Feb. 23, 1966 4 Sheets-Sheet 2
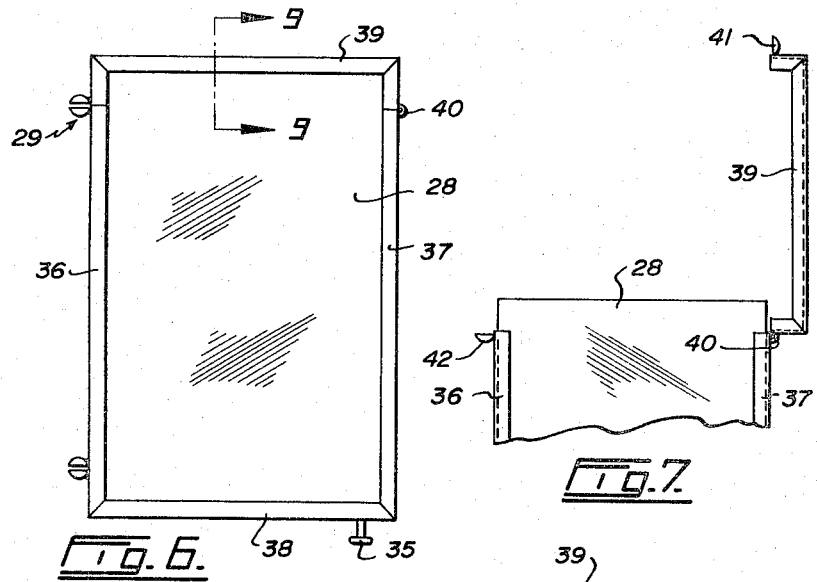
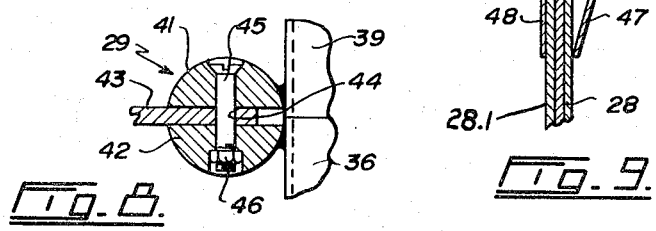
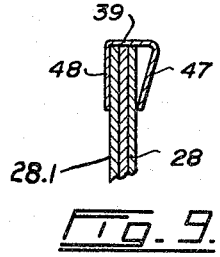
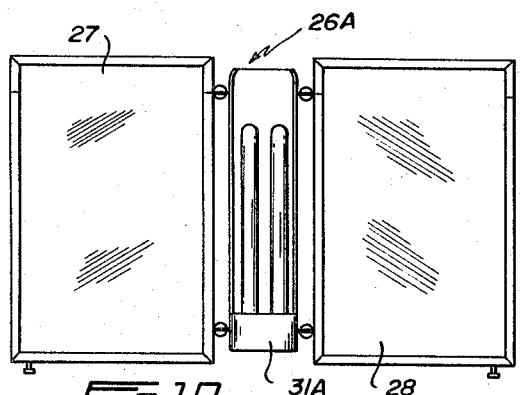
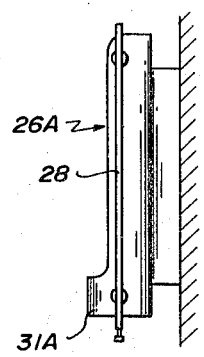
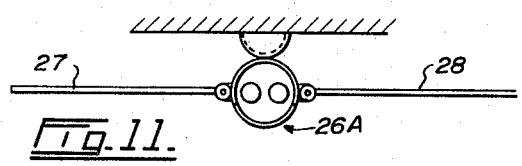

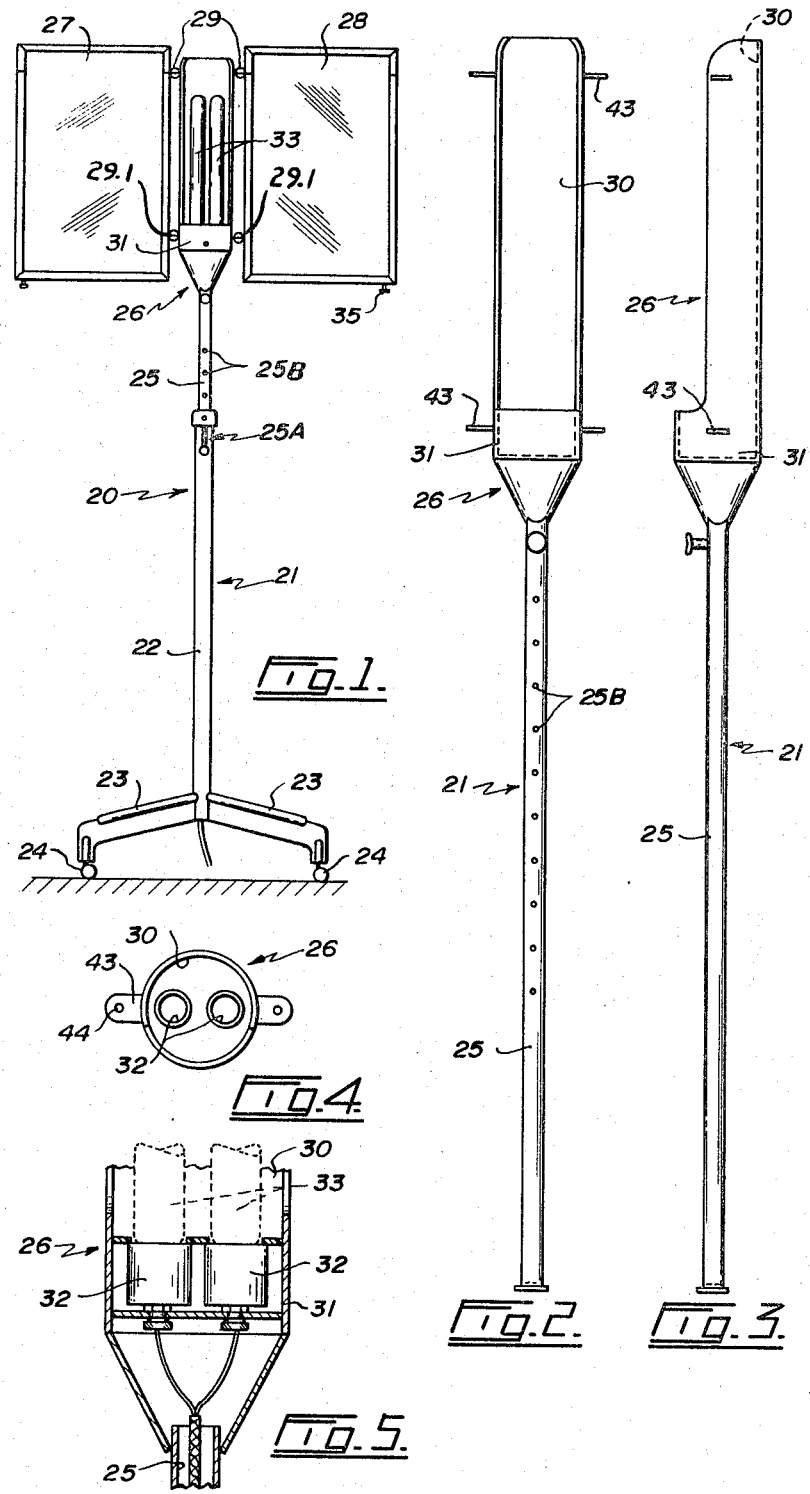

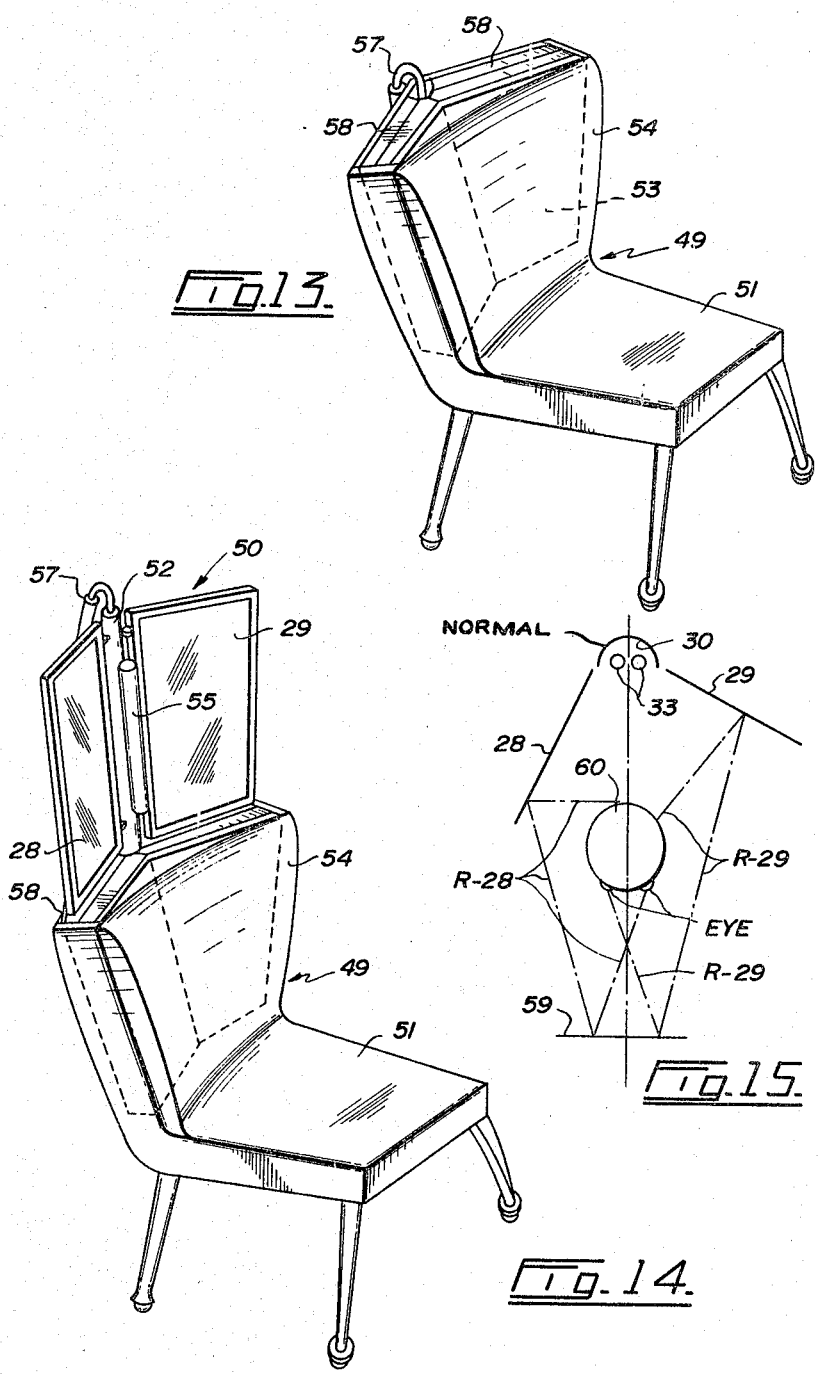

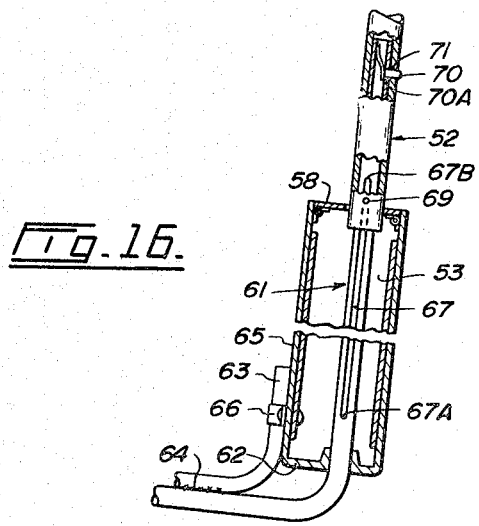
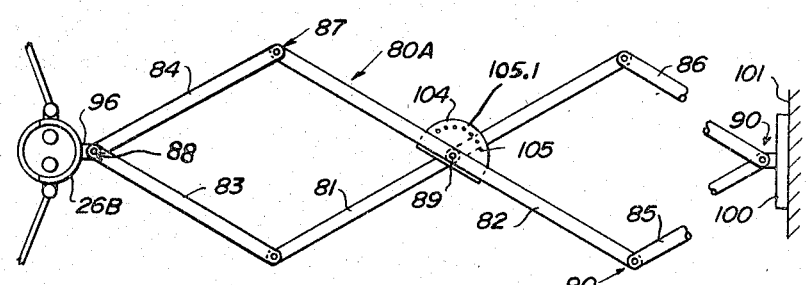
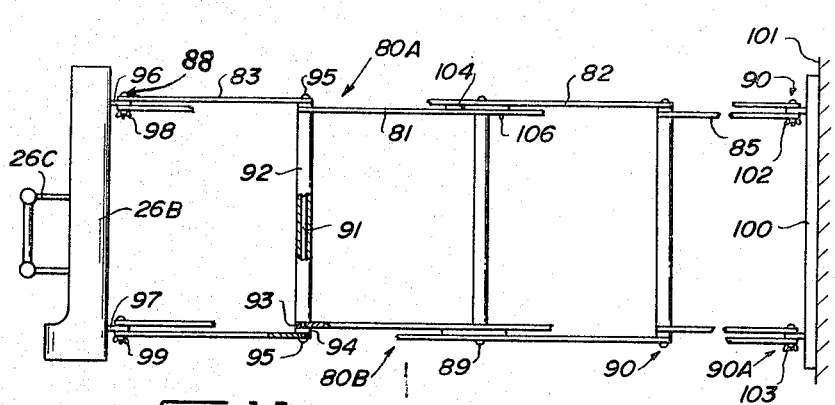

United States Patent Office 3,310,359
Patented Mar. 21, 1967

3,310,359
WING MIRROR ASSEMBLY
Karl H. Linke, 1266 E. 22nd Ave., Vancouver,
British Columbia, Canada
Filed Feb. 23, 1966, Ser. No. 529,338
Claims priority, application Great Britain, Mar. 16, 1965, 11,705/65
2 Claims. (Cl. 350—305)

The invention is a wing mirror assembly and illuminating means of the type used, for instance, to view the back of the head, or hair, or garments.

The use of wing mirrors in hinged relationship to a central mirror is well known. Such devices are commonly found in e.g. tailoring establishments, and, by means of these mirrors, the back and sides may be observed. As well, such mirror configurations are found in dressing table and "vanity" constructions. It is usually necessary to twist and turn in using such mirrors and, in the case of dressing table mirrors, a hand mirror is commonly required to obtain the desired view.

As is well known, in hairdressing shops, the back of the head is often examined with a hand mirror in which the reflection in a plane mirror is observed.

A simple plane mirror, used in conjunction with a hand mirror leaves something to be desired in, for instance, self-performed hairdressing operations where both hands should be free. As well, lighting is apt to be a problem.

My invention provides a mirror structure in which two plane mirrors are hinged, on substantially vertical spaced axes, to a central member containing a vertically disposed, preferably tubular, lamp or lamps and, in one embodiment, by providing convenient vertically adjustable stand means for supporting the assembly at a proper distance from the floor. Such a configuration is used in conjunction with a plane mirror, for instance of a dressing table, and reduces the difficulties and disadvantages above.

In an alternative embodiment, the assembly is adapted for wall mounting on a bracket means maintaining the assembly close to the wall. An alternate bracket is provided which is adapted to hold the assembly at an adjustable distance from the wall and adapted to provide ready resetting to a particular position.

In a further embodiment, the mirror and light assembly is adapted to be concealed within a back frame of a chair when not in use, and is retractable from the concealed position to an operative position.

It is seen that basically my invention includes a combination of two wing mirrors adapted to rotate about spaced generally vertical axes, and a suitable light source intermediate the axes being generally coplanar therewith, constructed and arranged to be used in conjunction with a plane mirror so that an individual between the wing mirrors and the plane mirror may observe, with adequate illumination, double reflected images which would not be seen by means of a plane mirror alone, and constructed and arranged so that the light source directs light to an area an image of which is to be observed, and so that light reaches eyes of the individual by reflection from the said surface rather than directly or by reflection from a mirror.

A mirror of a movable wing mirror assembly is more likely to be broken than, for instance, a mirror secured to a wall or forming a part of a dressing table. Replacement tends to be difficult. I overcome this difficulty by providing a mirror frame constructed and arranged for ready removal and replacement of a mirror in the frame, which structure includes a novel hinge and locking arrangement forming further characterizations of my invention.

The invention is embodied in, but not limited to, particular examples as below described with reference to the figures, in which:

FIGURE 1 is a front elevation of an embodiment of the mirror and lamp configuration assembled to a floor standard, FIGURE 2 is a front elevation showing the lamp housing attached to a vertical member of the stand, FIGURE 3 is a side elevation of FIGURE 2, FIGURE 4 is a plan view of FIGURE 2, FIGURE 5 is an enlarged detail at a base end of the lamp housing, FIGURE 6 shows a wing mirror assembled to a frame, FIGURE 7 shows a hinged frame element in an open position, FIGURE 8 is a detail, partly in section, showing a top locking hinge element, FIGURE 9 is a section on line 9—9 of FIGURE 6, FIGURE 10 is a front elevation of a wall model embodiment of the invention, FIGURE 11 is a top plan view of FIGURE 10, FIGURE 12 is a side elevation of FIGURE 10, FIGURE 13 is a perspective view of an embodiment adapted to be concealed in the back of an upholstered chair, FIGURE 14 is a perspective view of the FIGURE 13 embodiment showing the mirror and lamp assembly withdrawn to the operative position, FIGURE 15 is a diagram to illustrate how an image of the back of the head of an observer is formed, FIGURE 16 is a partly sectioned fragmented detail referring to the embodiment of FIGURES 13 and 14, showing mirror assembly retracting and storage structure, FIGURE 17 is a plan view of a wall mounted embodiment wherein a mirror assembly may be adjustably spaced from a wall, FIGURE 18 is an elevation of FIGURE 17.

In all of the embodiments, electrical connections are deemed to be obvious and from no part of my invention, they are therefore not described.

A floor standard embodiment, indicated generally by the numeral 20, is shown in FIGURE 1. A stand structure 21 has a vertical hollow column 22 to the lower end of which are attached three foot members 23 provided with castors 24.

A rod 25 is longitudinally slidable within the hollow column 22. The rod may be secured in the column at any one of a series of positions by engagement of a locking means 25A with sidewalls any one of several vertically aligned holes, or indentations, 25B, of the rod. These holes or indentations may be numbered so that a particular desirable setting, once determined, may readily be recovered. The numeral 26 indicates generally a lamp housing assembly secured to the upper end of the rod 25. A left wing mirror 27 and a right wing mirror 28, are hinged to outer walls of the housing by top hinge means 29, and by bottom hinges 29.1 so that the said mirrors are rotatable about spaced vertical axes.

Referring to FIGURES 2, 3, and 4, the lamp housing 26 is generally semi-circular in section so as to provide a reflector 30 having a base 31. Certain known advantages would be obtained by use of a reflector parabolic in section, but I find a simple semi-circular reflector to give satisfactory results. The base 31 contains sockets 32 for vertically disposed tubular lamps 33 not here shown, but seen in FIGURE 1. It is apparent that, while filament type tubular lamps may be used in the sockets 32, the lamp housing may obviously be adapted for, for instance, fluorescent lamps, or for such special illumination means as might be required.

FIGURE 5 is an enlarged scale detail clearly to show the arrangement of the lamp sockets 32 on the lamp housing base portion 31.

Referring to FIGURES 6 and 7, the mirror 28 is retained within channels of frame side members 36, 37, and of a bottom member 38. A top frame member 39 is hinged at 40 to the side member 39 so that the top member may swing to an open position, FIGURE 7, when the mirror 28 may be removed.

As before stated, the wing mirrors are hinged to the housing 26 by locking hinges 29 and 29.1. Detail of a top hinge 29 is shown at enlarged scale in FIGURE 8. Each hinge 29 includes a top element 41 secured to the top mirror frame member 39, and a lower element 42 secured to the frame member 36. When the mirror frame top element is closed as seen in FIGURES 8 and 6, the said hinge elements are in vertically spaced relationship to one another to receive hinge element 43 secured to the long housing assembly 26 as is best seen in FIGURES 2 and 3. As seen in FIGURE 3, the hinge element 43 has a hole 44 so that, see now FIGURE 8, a hinge bolt 45 may pass through the upper hinge element 41, the hole 44, and the lower hinge element 42. Thus, when a nut 46 is tightened upon the bolt, the bolt serves both as a hinge pin and to secure the top frame member 39 in a closed position as shown in FIGURE 6, so to retain the mirror 28 within the, now closed, frame.

FIGURE 9 is a section on line 9—9 FIGURE 6, through the top frame member 39. It is seen that the said frame member has a front edge portion 47 constructed and arranged to exert a spring pressure to urge the mirror 28, and obvious backing thereto designated generally 28.1, against a rear edge portion 48 of the said top member so firmly securing the mirror, the side and bottom frame members 36, 37, 38 are similar in section.

FIGURES 10, 11, 12 illustrate an embodiment of the invention adapted for wall mounting. In this embodiment a lamp housing element, designated 26A, is generally similar to that previously described, the case 31A however differs in shape from the base 31 since provision for attachment of the vertical rod member (25, FIGURE 1) is not here required. A further wall mounting embodiment according to FIGURES 17 and 18 is described later.

FIGURES 13 and 14 illustrate a construction wherein the wing mirror assembly is adapted to be stored out of sight within the back of a chair, and may be withdrawn therefrom to an operative position.

This embodiment, indicated generally by the numeral 49 includes a wing mirror assembly 50, a chair 51, and means to store the assembly therein.

Left and right wing mirrors 28, 29, are hinged to a tubular member 52 about spaced axes as before described, comprising the mirror assembly 50. The member 52 is slidable of a support rod (best seen in FIGURES 17 and 18) secured to a bottom wall of a space 53 formed within a back 54 of the chair 51. A light source 55 is obviously mounted on the tubular member between the spaced axes, as shown and as before described in detail. The space 53 is open at the top of the back of the chair, thus the mirror assembly 50 is movable downwards from the FIGURE 14 position to the FIGURE 13 position, at which it is concealed within the back of the chair. A handle member 57 is provided to facilitate movement of the assembly. The top opening aforesaid is provided with hinged flap or cover plate members 50 having self closing spring means constructed and arranged so that the flaps are normally urged to a closed position, as seen in FIGURE 13. When the mirror assembly is moved either to retract or withdraw it from the back of the chair, the spring loaded flaps will thus readily open to permit upwards or downwards movement of the assembly as required.

The above structure is suitable where cost may not be a primary consideration. The cost of producing a special chair and back as above may be reduced by mounting generally similar support structure on the outside of the back of the chair. This alternative is not illustrated.

FIGURE 16 is a partly sectioned elevation showing details of structure by means of which the mirror assembly is adapted to be stored within the space 53 aforesaid. Referring to FIGURE 16, the tubular member 52 is slidable longitudinally over a support indicated generally by the numeral 61, the support 61 being strongly secured in the bottom wall 62, and extending therethrough to a part of the chair frame 63, to which it is secured for instance by welding as shown at 64. A sidewall 65 of the space 53 is also welded, or otherwise strongly secured to, the frame 63 as indicated at 66, so that the support and the opening wall 65 are substantially integral with the chair frame. The support 61, which is a tube, is central of the width of bottom wall 62, (that is central of the chair back 54, as seen in FIGURES 13 and 14) parallel to the side wall 65, and spaced therefrom by a distance adequate to accommodate the mirror assembly when retracted for storage, the position illustrated in FIGURE 13. A wall of the rod 61 has a longitudinal groove 67 extending from a lower end wall 67A to an upper and wall 67B thereof. A pin 69 is secured in a wall of the tubular member 52 adjacent a lower end thereof, the pin extending radially inwards to engage sidewalls of the groove aforesaid. The pin and groove and constructed and arranged for upward and downward travel of the slidable tubular member 52, the distance between the groove end walls 67A and 67B being greater than the required vertical motion. When the said slidable member is fully withdrawn to the FIGURE 14 position, a spring loaded button 70 secured to an inner wall of the hollow support rod 61 is urged radially outwards passing through a hole 70A of the support tube side wall, to engage sidewalls of a detent hole 71 of the slidable tubular member 52 when the assembly is fully withdrawn, so to secure it in that position. To retract the assembly, the button 70 is pressed inwards to clear the detent hole 71. The pin and groove construction 69, 67 prevents rotation of the slidable tubular member 52 with respect to the support 61. It is to be understood that the structure of which FIGURE 16 is a preferred embodiment, must be rigid to ensure proper support for the mirror assembly 50 which is obviously secured to the said support as best seen in FIGURE 14. The groove and pin construction 66, 67 may be duplicated to increase effective torsional strength, or for the groove 67 a slot extending through the sidewall may be substituted. I prefer a groove however as, other things being equal, the groove construction is stronger. There are other equivalents which will be apparent to these skilled in the mechanical arts, and which may be used in substitution for the particular structure described and illustrated.

In a chair embodiment, the mirrors are more apt to be damaged than in a stand or wall version. Hence, ready means of replacing the mirror—as illustrated in FIGURES 7 and 8—is of particular advantage.

FIGURES 17 and 18 disclose wall mounting structure comprising upper and lower extensible linkages designated respectively by the numerals 80A, 80B. Each said linkage has central crossed links 81, 82, outer links 83, 84, and inner links 85, 86, pin jointed to one another as indicated severally by the numerals 87, and by the numerals 88, 89, 90, to form the top linkage 80A seen in plan in FIGURE 17 and the bottom linkage which, as seen in FIGURE 18, is in parallel vertically spaced relationship to the top linkage. Each pin joint means 87 has a rod 91 within a spacing tube 92, the rod passing through holes 93 of the link members—which members are separated by washers 94. External ends of the rod 91 are obviously secured at 95, so that each assembly 87 provides vertical spacing and pin jointing as aforesaid. A housing generally as the housing 26A FIGURES 10, 11, 12, designated 26B has vertically spaced brackets 96, 97, including wing nuts 98, 99, obviously securing the housing 26B to the linkages 80A, 80B, in the spaced parallel relationship aforesaid, is provided with an obvious handle 26C shown in FIGURE 1B only. Means generally indicated by the numerals 90 and 90A similarly secure ends of the linkages remote from the housing to a wall bracket 100 secured to a wall 101. The means 90 and 90A include wing nuts 102, 103.

A generally semi-circular sector member 104 is secured to an underside of the upper central link 82 of the linkage 80A, the pin joint means 89 passing through a hole at the centre of the sector, which sector is of the same thickness as that a washer 94 of a pin joint means 87. The pin joint means 89 is otherwise as described with reference to pin joint means 87.

A sector has, near an outer periphery thereof, a tapped hole 105 to receive a stop bolt 106 seen in FIGURE 18 only. When the linkages 80A, 80B are extended so that the acute angle between the central links is some 45°, further extension is undesirable—which position is illustrated in FIGURE 17. The hole 105 is in such position that, when the stop bolt 106 is in the hole 105, the linkage cannot be extended beyond the FIGURE 17 position. Additional circumferentially spaced tapped holes, of which one is designated 105.1, are provided as shown and, when the stop bolt is inserted in one of these, the maximum extension has a progressively smaller limit according to the hole in which the stop bolt is placed. The holes can be numbered. In a particular installation, one particular extension will often be optimum—when this extension has been established the stop bolt can be inserted in the tapped hole corresponding to that extension when the linkages may be extended to that position, but not therebeyond. The wall embodiment of FIGURES 17 and 18 thus provides structure adapted to extend a wing mirror assembly, as previously described, to any one of several fixed distances from a wall mounting bracket.

FIGURE 15 is a diagram to illustrate how the invention is used. The invention, say the FIGURE 1 embodiment, is placed as shown in relation to a plane mirror 59 —which may be a dressing table mirror. An individual, the head of whom is indicated by the numeral 60, stands or sits between the lamps 33 and the plane mirror 59. The head is held substantially on a normal from the lamps to the mirror 59. Previously, the position of the vertically movable rod 25 will have been adjusted to a suitable height according to whether the individual be seated or standing, and according to the particular area to be observed. It is convenient that the stand be oriented so that, when the mirrors are open, that is to say substantially in the same plane, that plane shall be roughly parallel to the plane of the mirror 59.

In FIGURE 15, the wing mirror 28 has been placed at an acute angle to the normal, while the mirror 29 is at an acute angle to the plane of the mirror 59. The rays marked R28 show what part of the head will be seen by the eyes of the observer as reflected from the mirror 28, and it is also clear that the mirror 29, at a different angle, will reflect a different part of the back of the head as indicated by the rays R29.

The position of the stand may be altered to alter the length of the normal, the observer may be proportionately closer to further away from the mirror 59 than shown in FIGURE 15, and may be to one side of the normal. The height of the mirror assembly may be altered, and the angular setting of one or both wing mirrors may be varied.

Thus, by altering one or more of the foregoing conditions, there are available many possibilities of observing images of different parts and aspects—close up or more distant—of back and side portions. At a particular optimum, substantially all of a coiffure, for example— that is front back and sides—may be observed with little or no movement of the head. Commonly however, the head will be moved so that different aspects are seen.

Structure by means of which two mirrors 28, 29, are swingable about two spaced substantially vertical axes possesses the desirable characteristics above when used in the manner described. However, to realize these advantages adequate lighting is required. It is apparent that were room lighting, either natural or artificial, to be relied upon, inherently in at least some positions it would be difficult to obtain proper viewing of at least some parts and aspects. It is clear that the lighting structure illustrated minimizes this difficulty so to permit effective utilizaion of the subject mirror structure by providing an illuminating source in an optimum position. It is also apparent from FIGURE 15 that rays from the illumination source will reach the eyes after reflection from the surface being observed—and not generally by direct reflection from the mirrors—thus avoiding glare. The use of the other examples of my invention as disclosed and illustrated will be apparent from the foregoing description.

In certain cases, for instance scrutinizing of hair tinting, examination of make-up with particular attention to colour, and in theatrical make up, there is required not only illumination of proper intensity, but illumination having particular colour characteristics. The effect of colour characteristic in such matters is well understood in the art, therefore I have not specified what particular illumination means should be used according to a specific purpose to which my invention is to be put. Rather, I have devised structure to which any commonly used illumination means is adaptable. While I have given particular examples using common tubular fluorescent or incandescent sources, it is to be understood that I contemplate the use of light sources of particular intensity and characteristic where such may be required.

What I claim is:

1. A mirror assembly including in combination two wing mirrors mounted to rotate about generally vertical spaced axes, and a light source within a housing intermediate the axes and generally coplanar therewith, to be used in conjunction with a plane mirror, so that an individual between opposed reflecting surfaces of the wing mirrors and the plane mirror may observe a double reflected image of a part of himself illuminated by light from the source being reflected from the part, without rays from the light source impinging either directly or by mirror reflection upon an eye of the individual; the combination comprising
   (a) wing mirrors having frame side members including a channel member to receive side edges of the mirror, which channel includes spring means adapted to bear upon a surface of the mirror securing the mirror within the channel member, a said frame side member being hingedly connected to an adjacent frame side member so that the hinged frame member can swing open to permit the mirror to be withdrawn from the frame, means to lock an end of the hinged frame side member remote from the hinge thereof to an adjacent frame side member,
   (b) the locking means comprising locking hinges connecting edges of the wing mirrors for rotation about the generally vertical spaced axes aforesaid, each locking hinge having an outward extending top element secured to the top mirror frame member and an outward extending lower element secured to an adjacent frame member, the upper and lower elements aforesaid being in spaced vertically aligned relationship, hinge elements secured to the vertically spaced axes which hinge elements are adapted to fit between the spaced upper and lower elements, hinge bolt means passing through the upper and lower elements and the hinge elements so as to provide means by which each wing mirror is rotatable about an axis aforesaid.

2. A combination as defined in claim 1, the mirror assembly being secured to one end of an extensible device, the other end of which is fixed, the said device having vertically spaced similar linkages comprising central crossed links, outer links, and inner links, pin jointed to one another to form extensible linkages, and means to limit extension of the device which means comprises, a generally circular sector member secured to an underside of an upper link of two central crossed links of the said linkage; pin joint means passing through a hole of the upper link, through a hole of the sector at the centre thereof, and through a hole of the lower link of the two central links aforesaid, a stop bolt securable in a circumferential hole of the sector, the stop bolt being so secured extension of the linkage being limited to a position whereat a side edge of the lower central link comes in contact with, and is restrained by, the stop bolt aforesaid.

References Cited by the Examiner

UNITED STATES PATENTS

| | | | |
|---|---|---|---|
| 662,736 | 11/1900 | Prahar | 40—152 |
| 715,038 | 12/1902 | Dunham | 248—277 |
| 1,216,696 | 2/1917 | John | 240—4.2 X |
| 1,338,582 | 4/1920 | Morris et al. | |
| 2,115,130 | 4/1938 | Thurn et al. | 40—152 X |
| 2,573,443 | 10/1951 | Holland | 88—98 X |
| 2,616,197 | 11/1952 | Osburn | 40—152 |
| 2,675,132 | 4/1954 | Susil. | |

JEWELL H. PEDERSEN, *Primary Examiner.*

W. L. SIKES, *Assistant Examiner.*